US012627421B2

(12) United States Patent
Chari et al.

(10) Patent No.:  US 12,627,421 B2
(45) Date of Patent:  May 12, 2026

(54) ADAPTIVE AGGREGATION OF METRICS FOR OFDM/OFDMA PROFILE GENERATION

(71) Applicant: ARRIS Enterprises LLC, Suwanee, GA (US)

(72) Inventors: Santhana Chari, Johns Creek, GA (US); David Emery Virag, Johns Creek, GA (US); Janaki Sajja, Attleboro, MA (US); Deepak Garageswari Jagannath Rao, Beaverton, OR (US)

(73) Assignee: ARRIS Enterprises LLC, Horsham, PA (US)

( * ) Notice: Subject to any disclaimer, the term of this patent is extended or adjusted under 35 U.S.C. 154(b) by 330 days.

(21) Appl. No.: 18/204,827

(22) Filed: Jun. 1, 2023

(65) Prior Publication Data

US 2023/0396374 A1  Dec. 7, 2023

Related U.S. Application Data

(60) Provisional application No. 63/347,975, filed on Jun. 1, 2022, provisional application No. 63/347,957, filed on Jun. 1, 2022.

(51) Int. Cl.
*H04L 1/20* (2006.01)
*H04L 12/28* (2006.01)
*H04L 27/34* (2006.01)
*H04W 28/04* (2009.01)

(52) U.S. Cl.
CPC .......... *H04L 1/203* (2013.01); *H04L 12/2801* (2013.01); *H04L 27/34* (2013.01); *H04W 28/04* (2013.01)

(58) Field of Classification Search
None
See application file for complete search history.

(56) References Cited

U.S. PATENT DOCUMENTS

| | | | | |
|---|---|---|---|---|
| 2015/0188653 A1* | 7/2015 | Hanks | ................. | H04L 27/0012 |
| | | | | 370/203 |
| 2015/0188668 A1* | 7/2015 | Al-banna | .............. | H04L 5/0044 |
| | | | | 370/208 |
| 2017/0141887 A1* | 5/2017 | Garcia | .................... | H04L 43/16 |
| 2018/0131582 A1* | 5/2018 | Schnitzer | ................ | H04L 41/40 |
| 2019/0305879 A1* | 10/2019 | Henry | ....................... | H04B 3/54 |
| 2020/0389239 A1* | 12/2020 | Garcia | .................. | H04L 1/0009 |

OTHER PUBLICATIONS

International Search Report and Written Opinion RE: Application No. PCT/US2023/024173, dated Nov. 6, 2023.
Schnitzer Jason et al: "Toward Programmable DOCSIS 4.0 Networks: Adaptive Modulation in OFDM Channels", IEEE Transactions on Network and Service Management, IEEE, USA, vol. 18, No. 1, Dec. 16, 2020, pp. 441-455, XP011841797, DOI: 10.1109/TNSM.2020.3044850 figure 5, sections V, VI.

* cited by examiner

*Primary Examiner* — Anh Vu H Ly

(74) *Attorney, Agent, or Firm* — Chernoff, Vilhauer, McClung & Stenzel, LLP

(57) ABSTRACT

Devices, systems and methods for adaptively associating a percentile value to each of a plurality of subcarriers at which a cable modem communicates data, the percentiles value used to respectively determine an aggregated RxMER value for each subcarrier. The aggregated RxMER values for the subcarriers may be used to determine and assign one or more bitloading profiles to the cable modem.

15 Claims, 17 Drawing Sheets

| Aggregation Percentile | Anticipated Throughput Based On NXT/ICO-2 Profile Generation (Mbps) | Actual Computed Throughput For 48-Hour Period (Mbps) |
|---|---|---|
| 5 | 1568 | 1608 |
| 25 | 1689 | 1688 |
| 50 | 1691 | 1690 |
| 75 | 1723 | 1714 |
| 95 | 1731 | 1725 |

Receive RxMER Data For
CM                                          202

Select Range Of Subcaller
For Analysis                                204

Analyze RxMER Data For
Selected Range                              206

Determine Percentile
Dynamically Based On Analysis               208

Use Determined Percentile
To Select Aggregate RxMER
Value                                       210

Use Aggregate RxMER
Value To Determine
Bitloading Profiles                         212

Assign Bit Loading
Profiles To Cable
Modems                                      214

| QAM Values | RxMER Threshold Values In dB | | |
|---|---|---|---|
| | BerMax=0.005 | BerMax=0.0025 | BerMax=0.001 |
| 4 | 15 dB | 15.75 dB | 16.5 dB |
| 5 | 18.25 | 19 | 19.75 |
| 6 | 21 | 21.75 | 22.5 |
| 7 | 24 | 24.75 | 25.5 |
| 8 | 27.25 | 27.75 | 28.5 |
| 9 | 30.75 | 31.25 | 32 |
| 10 | 34 | 34.75 | 35.5 |
| 11 | 37.25 | 37.75 | 38.5 |
| 12 | 41.25 | 41.75 | 42.5 |
| 13 | 44.5 | 45 | 45.75 |
| 14 | 47.75 | 48.5 | 49 |

*FIG. 15*

| QAM Value | Computed Throughput |
|---|---|
| 6 | 990.4 |
| 8 | 1320.5 |
| 9 | 1485.6 |
| 10 | 1650.6 |
| 11 | 1815.7 |
| 12 | 1980.8 |
| 14 | 2310.9 |

FIG. 16

ADAPTIVE AGGREGATION OF METRICS FOR OFDM/OFDMA PROFILE GENERATION

CROSS REFERENCE TO RELATED APPLICATIONS

This application claims the benefit of U.S. Provisional Patent Application Ser. No. 63/347,975 filed Jun. 1, 2022 and U.S. Provisional Patent Application Ser. No. 63/347,957 filed Jun. 1, 2022.

BACKGROUND

The subject matter of this application generally relates to devices, systems and methods that determine bitrate profiles in Hybrid Fiber Coax (HFC) systems.

Cable Television (CATV) services have historically provided content to large groups of subscribers from a central delivery unit, called a "head end," which distributes content to its subscribers from this central unit through a branch network comprising a multitude of intermediate nodes. Modern CATV service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber, and to the content provider through the branch network.

To this end, these CATV head ends include a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). Still other modern CATV systems called Remote PHY (or R-PHY) relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency, and converts the upstream RF data sent by cable modems from analog-to-digital format to be transmitted optically to the core. Other modem systems push other elements and functions traditionally located in a head end into the network, such as MAC layer functionality (R-MAC-PHY), etc.

CATV systems traditionally bifurcate available bandwidth into upstream and downstream transmissions, i.e., data is only transmitted in one direction across any part of the spectrum. For example, early iterations of the Data Over Cable Service Interface Specification (DOCSIS) specified assigned upstream transmissions to a frequency spectrum between 5 MHz and 42 MHz and assigned downstream transmissions to a frequency spectrum between 50 MHz and 750 MHz. Later iterations of the DOCSIS standard expanded the width of the spectrum reserved for each of the upstream and downstream transmission paths, but the spectrum assigned to each respective direction did not overlap. Recently, proposals have emerged by which portions of spectrum may be shared by upstream and downstream transmission, e.g., full duplex and soft duplex architectures.

Orthogonal Frequency Division Multiplexing (OFDM) technology was introduced as a cable data transmission modulation technique during the creation of the CableLabs DOCSIS 3.1 specification. OFDM technology was defined for use directly in the downstream direction and was adapted for multiple access (Orthogonal Frequency Division with Multiple Access—OFDMA) for use in the upstream direction. In each direction, the relatively wide channel is subdivided into many small subcarriers. In the downstream direction, each of these subcarriers may use its own Quadrature Amplitude Modulation (QAM) level, which equates to a different bit capacity per subcarrier QAM symbol. In the upstream direction, groups of subcarriers are combined and, when time multiplexed, create the atomic unit of upstream bandwidth assignment known as a "minislot." In the upstream direction, all subcarriers of a minislot are assigned the same QAM level and thus all subcarriers of a minislot have the same bit capacity per QAM symbol.

The purpose of OFDM/OFDMA technology is to maximize the efficiency of data transmissions across a cable data network by optimizing the QAM modulation level used for each subcarrier of RF frequency bandwidth. Ideally, each cable modem would be assigned its own vector of per-subcarrier QAM modulation levels, i.e. a. bit loading vector, that is uniquely optimized for that cable modem. For cost reasons, however, the DOCSIS 3.1 specification defines a compromise where groups of cable modems having similar RF characteristics can be assigned the same bit loading vector, if that vector is constructed such that that all cable modems assigned that vector could use it. In this manner, the needed number of bit loading vectors could be reduced to a cost-manageable set of "bit loading profiles" that could each be assigned to multiple cable modems at once. For example, the current generation of DOCSIS allows head ends that communicate with cable modems to utilize up to sixteen bit loading profiles per channel in the downstream direction and up to seven bit loading profiles per channel in the upstream direction. Similarly, the current generation of DOCSIS permits each cable modem to be assigned up to five profiles per channel in the downstream direction and up to two profiles per channel in the upstream direction.

However, because each cable modem is no longer assigned a bit loading profile uniquely optimized for that cable modem, transmissions over the network are more prone to errors. What is desired, therefore, are improved devices, systems, and methods of determining a plurality of bit loading vectors that are assigned among cable modems in a DOCSIS network.

BRIEF DESCRIPTION OF THE DRAWINGS

For a better understanding of the invention, and to show how the same may be carried into effect, reference will now be made by way of example to the accompanying drawings, in which:

FIG. 5 shows throughputs achieved for each of a number of different percentile error metric values selected for use in bitloading vector assignments.

FIG. 15 shows how QAM values may be determined from RxMER values.

FIG. 16 shows how throughput may be determined from QAM values.

DETAILED DESCRIPTION

OFDM is based on the well-known technique of Frequency Division Multiplexing (FDM). In FDM different streams of information are mapped onto separate parallel frequency channels. Each FDM channel is separated from the others by a frequency guard band to reduce interference between adjacent channels.

Orthogonal Frequency Division Multiplexing (OFDM) extends the FDM technique by using multiple subcarriers within each channel. Rather than transmit a high-rate stream of data with a single subcarrier, OFDM makes use of a large number of closely spaced orthogonal subcarriers that are transmitted in parallel. Each subcarrier is modulated with a conventional digital modulation scheme (e.g. QPSK, 16QAM, etc.) at low symbol rate. However, the combination of many subcarriers enables data rates similar to conventional single-carrier modulation schemes within equivalent bandwidths.

Figure 1:
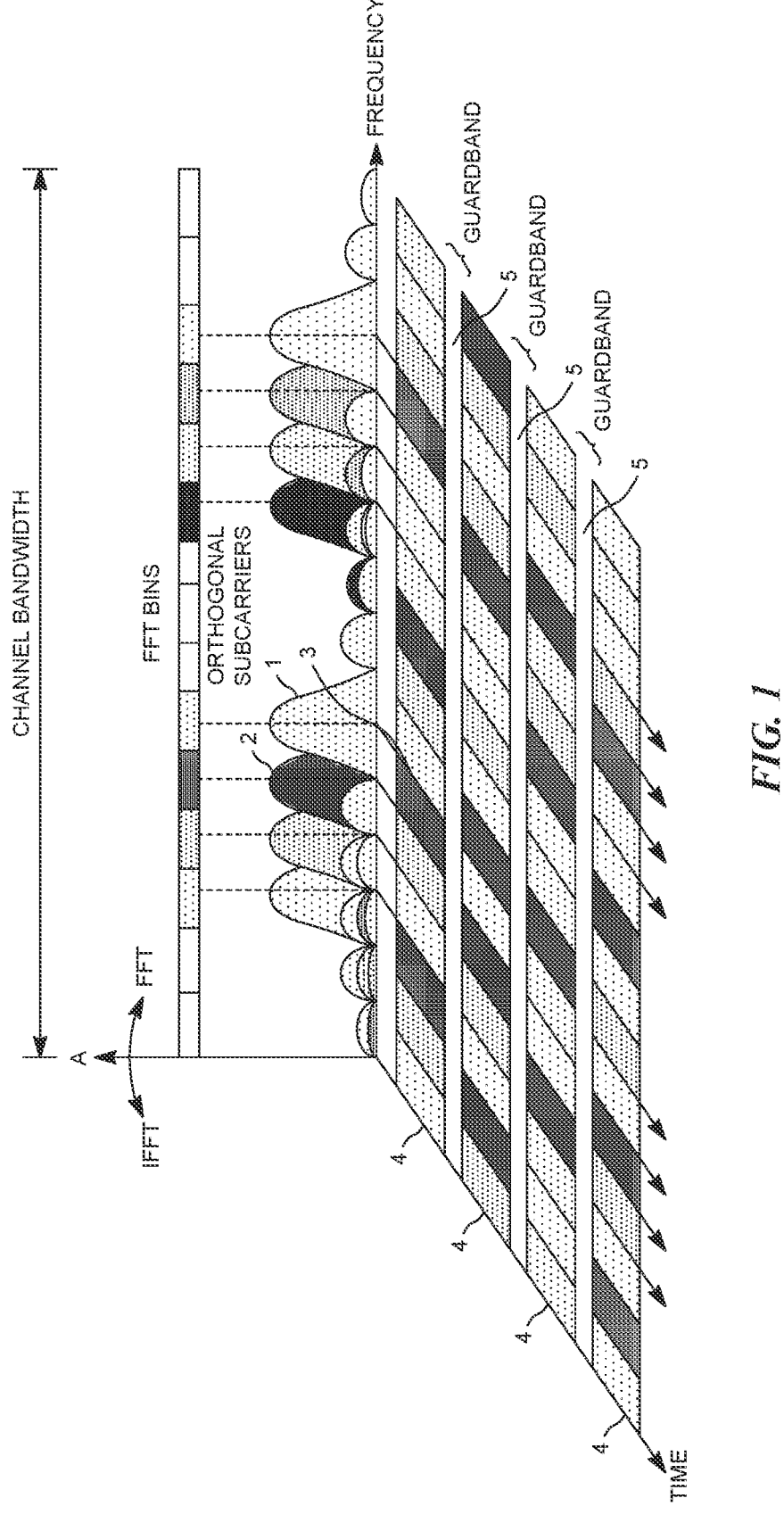
FIG. 1 illustrates Orthogonal Frequency Division Multiplexing.

Referring for example to FIG. 1, in the frequency domain, adjacent orthogonal tones or subcarriers 1 and 2 may be each independently modulated with complex data. Though only two subcarriers are illustrated in FIG. 1, those of ordinary skill in the art will appreciate that a typical OFDM transmission will include a large number of orthogonal subcarriers. As just note noted, subcarriers 1 and 2 (as well as all other subcarriers) are orthogonal to each other. Specifically, as can be seen in FIG. 1, subcarrier 1 has spectral energy comprising a sinc function having a center frequency 3 with sidebands having peaks and nulls at regular intervals. These sidebands overlap those of subcarrier 2, but each of the spectral peaks of subcarrier 1 align with the nulls of subcarrier 2. Accordingly, the overlap of spectral energy does not interfere with the system's ability to recover the original signal; the receiver multiplies (i.e., correlates) the incoming signal by the known set of sinusoids to recover the original set of bits sent.

In the time domain, all frequency subcarriers 1, 2 etc. are combined in respective symbol intervals 4 by performing an Inverse Fast Fourier Transform (IFFT) on the individual subcarriers in the frequency domain. Guard bands 5 may preferably be inserted between each of the symbol intervals 4 to prevent inter-symbol interference caused by multi-path delay spread in the radio channel. In this manner, multiple symbols contained in the respective subcarriers can be concatenated to create a final OFDM burst signal. To recover the signal at a receiver, a Fast Fourier Transform (FFT) may be performed to recover the original data bits.

Figure 2:
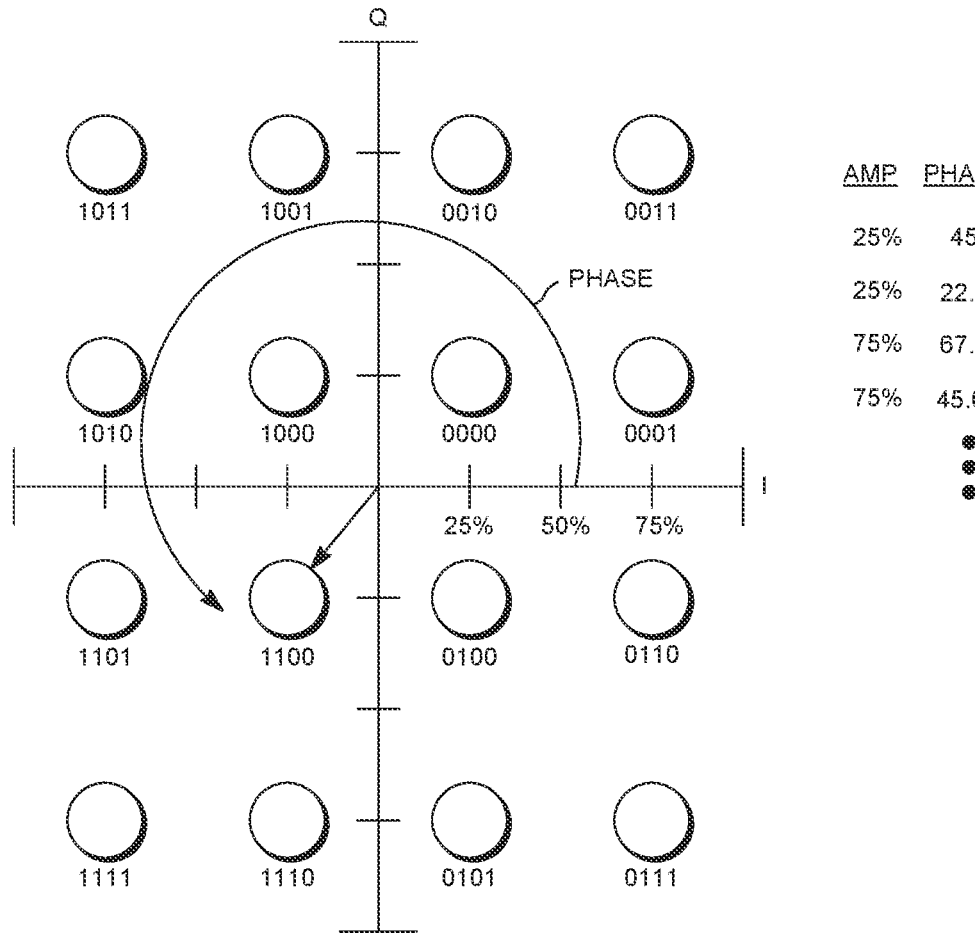
FIG. 2 illustrates a Quadrature Amplitude Modulation technique.

As also noted previously, each subcarrier in an OFDM transmission may be independently modulated with complex data among a plurality of predefined amplitudes and phases. FIG. 2, for example, illustrates a Quadrature Amplitude Modulation (QAM) technique where a subcarrier may be modulated among a selective one of sixteen different phase/amplitude combinations (16QAM). Thus, for example, subcarrier 1 of FIG. 1 may in a first symbol interval transmit the symbol 0000 by having an amplitude of 25% and a phase of 45° and may in a second symbol interval transmit the symbol 1011 by having an amplitude of 75% and a phase of 135°. Similarly, the subcarrier 2 may transmit a selected one of a plurality of different symbols.

FIG. 2 illustrates a 16QAM modulation technique, but modern DOCSIS transmission architectures allow for modulations of up to 16384QAM. Moreover, each of the subcarriers 1, 2, etc. shown in FIG. 1 may operate with its own independent QAM modulation, i.e. subcarrier 1 may transmit a 256QAM symbol while subcarrier 2 may transmit a 2048QAM symbol. Thus, in order for a receiver and a transmitter to properly communicate, a bit loading profile is a vector that specifies, for each subcarrier, the modulation order (16QAM, 256QAM, etc) used by the subcarrier during a symbol interval. The current DOCSIS 3.1 specification allows each cable modem to be assigned up to five different bit loading profiles in the downstream direction, and up to two different bit loading profiles in the upstream direction. The bit loading profile used for a given symbol interval is communicated between the cable modem and a head end, so that transmitted information can be properly decoded.

Figure 3:
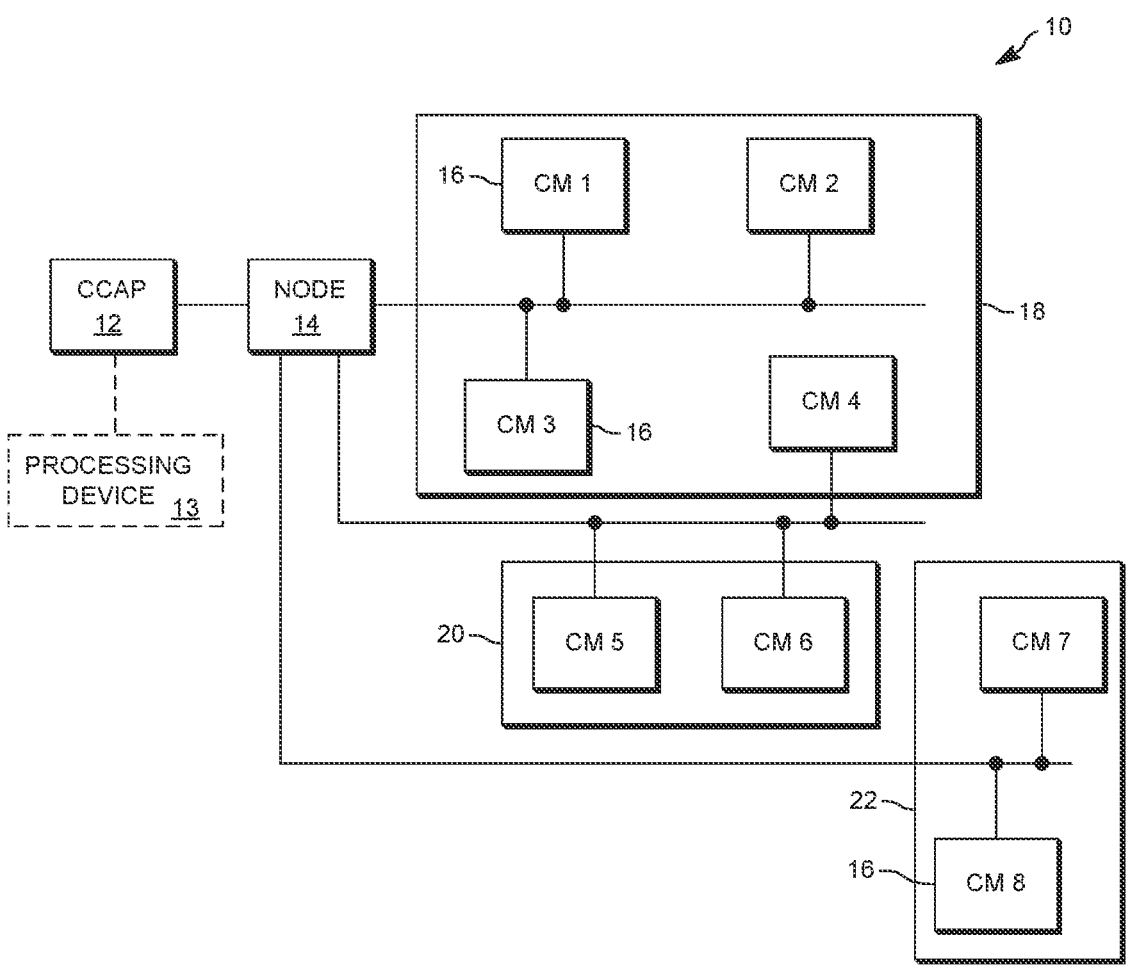
FIG. 3 shows an exemplary HFC architecture embodying the techniques disclosed in the present application.

FIG. 3 illustrates a system that uses bit loading profiles to communicate data in a DOCSIS architecture. Specifically, a system 10 may include a Converged Cable Access Platform (CCAP) 12 typically found within a head end of a video content and/or data service provider. Those of ordinary skill in the art will recognize that the disclosed systems and methods may be used with a Cable Modem Termination Service (CMTS) instead of a CCAP. The CCAP 12 communicates with a plurality of cable modems 16 at its customers' premises via a network through one or more nodes 14. Typically, the network may be a hybrid fiber-coaxial network where the majority of the transmission distance comprises optical fiber, except for trunk lines to cable taps (not shown) at the customers' premises and cabling from the taps to the cable modems 16, which are coaxial. More recent architectures, e.g. Fiber-to-the-Premises (FTTP) however, have replaced the entire line from the upstream node with optical fiber.

As already mentioned, ideally each cable modem 16 would be assigned a bit loading profile specifically tailored to the performance characteristics of that cable modem. For example, higher nodulation orders can be assigned to subcarriers experiencing higher a SNR characteristic over a channel used by a cable modem, and lower modulation orders may be best for subcarriers with a low SNR characteristic. In this manner, the bandwidth efficiency of transmissions to and from a cable modem are high when if the cable modem's ideal bit loading vector closely follows the bit loading profile in use by the cable modem. However, because the DOCSIS standard restricts the number of available profiles that can be used by cable modems, a CCAP 12 must communicate with multiple cable modems 16 with different SNR profiles using the same bit loading profile. For example, as FIG. 3 shows an example where cable modems 16 are segmented into groups 18, 20, and 22 where the cable modems 16 in each group are assigned a common bit loading profile by the CCAP 12. This virtually guarantees that not all cable modems will use a bit loading profile that closely follows its optimum bit loading vector.

Thus, in order to most efficiently use the limited number of available bit loading profiles, the CCAP 12 preferably divides cable modems 16 into groups that each have similar performance characteristics. To this end, the CCAP 12 may periodically include in the downstream transmission known pilot tones that together span the entire OFDM downstream bandwidth. Each cable modem 16 then uses these pilots to measure its error for received downstream transmissions at each subcarrier frequency, where the error at a particular modulation frequency is measured based on the vector in the I-Q plane (shown in FIG. 2) between the ideal constellation point at that modulation order and the actual constellation point received by the receiver. Such error measurements may comprise any of several available forms, including the actual error vector, the Euclidian distance between these two points, or the Modulation Error Ratio (MER) calculated from the error vector. Alternatively, in some embodiments, the error measurement may be expressed as a maximum QAM value that a cable modem may reliably use at a given subcarrier, given the measured error. For example, the DOCSIS 3.1 PHY specification contains tables that map modulations orders to the minimum carrier-to-noise ratios (approximated by MER) required to carry them, as shown in the following exemplary table in the downstream direction:

| Constellation | CNR (1 GHz) | CNR (1.2 GHZ) |
|---|---|---|
| 4096 | 41 | 41.5 |
| 2048 | 37 | 37.5 |
| 1024 | 34 | 34. |
| 512 | 30.5 | 30.5 |
| 256 | 27 | 27 |
| 128 | 24 | 24 |
| 64 | 21 | 21 |
| 16 | 15 | 15 |

In this exemplary table, "CNR" or Carrier Noise Ratio is defined as the total signal power in an occupied bandwidth divided by the total noise in that occupied bandwidth, and ideally is the equivalent of equalized MER.

The collection of the errors for a cable modem, across all subcarrier frequencies, produces the modulation error vector for that cable modem 16, which is transmitted back to the CCAP 12. For upstream transmissions, the process is generally reversed; the CCAP 12 commands each cable modem to send known pilot tones to the CCAP 12 together spanning the entire OFDM upstream bandwidth in a single upstream probing signal for each particular cable modem 16. The CCAP 12 uses these received probing signals to estimate the upstream modulation error vectors for each of the cable modems.

Once the CCAP 12 has assembled the modulation error vectors for all cable modems that it serves, it preferably uses these vectors to organize the cable modems into "N" groups of cable modems, where "N" is at most the number of profiles available to the collection of cable modems. For example, in a DOCSIS 3.1 environment, cable modems could be arranged in up to sixteen groups for receiving signals in the downstream direction and up to seven groups for receiving signals in the upstream direction.

In some embodiments, a K-means clustering technique may be used to arrange cable modems into groups. For example, in one such technique "N" seed vectors may be initially chosen by, e.g. randomly selecting error vectors from among the collection of cable modems, and using each of the cable modems associated with these vectors as the initial members of the "N" groups. Then, another cable modem is selected, and it is placed in the group for which the cable modem's error vector has the shortest Euclidean distance to the centroid of the error vectors already within that group. Once a cable modem is added to the group, the centroid for that group is updated based on the error vector of the added cable modem. This process repeats until all cable modems have been assigned to a group. Alternative K-means clustering techniques may also be employed, by for example, initially assigning all cable modems to the initial "N" groups based on the minimum Euclidean distance to the initial seed vectors and then recomputing the centroids of each group. After recomputing the centroids, each cable modem is reassigned, a new centroid is computed etc. until the process converges to a point where no cable modems are reassigned.

Once all cable modems are finally assigned into the desired plurality of groups, a set of available bit loading profiles may be generated to assign to the population of cable modems serviced by the head end in each of the upstream and downstream directions, and subsequently the cable modems in each group may be assigned profiles from this set. For example, some methods may select an initial or starting set of bit loading profiles, each representing a different tier or quality of service, where the bit loading profiles are subsequently adjusted based upon the groupings of cable modems as appropriate where, say a small change in a profile can bring several cable modems into that tier or to guarantee a tier of service to a specific cable modem.

As previously noted, assignment of bitloading profiles to cable modems is based upon error metrics specific to each of the cable modems being grouped. For example, one typical method receives as an input an RxMER value at each subcarrier for each cable modem and generates a given number of modulation profiles by grouping the cable modems using the error metrics. The profiles (P0, P1, P2 . . . ) are ordered by ascending bitrate. Bitrates are assigned to cable modems based on a set of rules. For example, all cable modems must be able to operate in P0, and most cable modems can also operate in at least one higher-bitrate profile. However, a cable modem assigned profile P3 may not be able to operate ion profile P1 or P2, though in some cases it may.

The procedure just described assumes a single RxMER data capture per cable modem, per subcarrier frequency. However, in practice, RxMER data for a cable modem across its subcarrier frequencies is collected periodically such as once an hour, once every fifteen minutes, etc., depending on the size of an operator's network and how well the collected data scales with an increasing number of cable modems. Thus, when multiple RxMER captures are made at each cable modem, this data must be aggregated, organized, and processed to select one or more representative MER values to associate with the cable modem before profiles are generated. This process should preferably be optimized, so that the bitrate or throughput is maximized while partial service (cable modems not operating in one or more OFDM/OFDMA channels) is preferably minimized.

Figure 4:
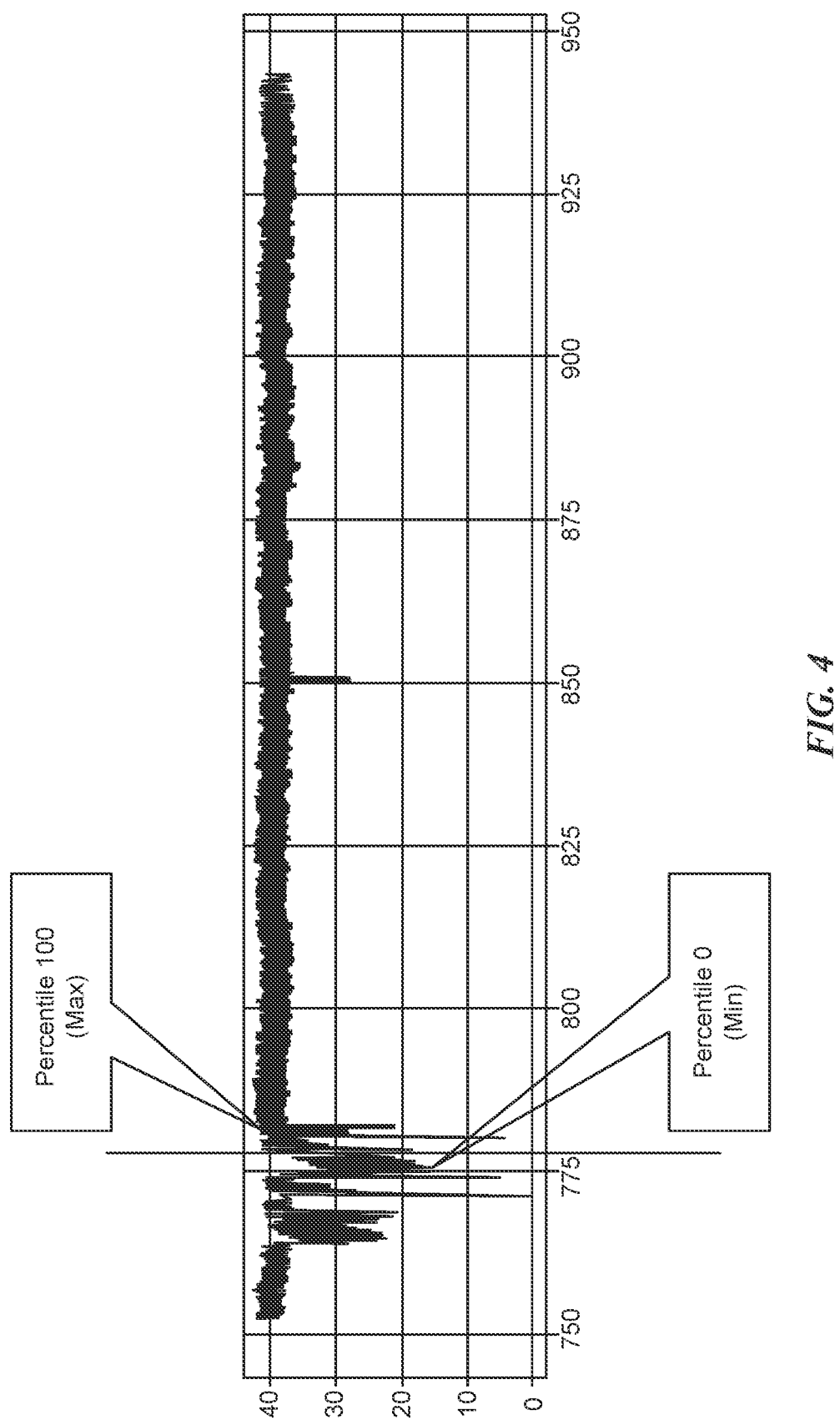
FIG. 4 shows an exemplary distribution of aggregated error metrics for a cable modem as a function of OFDMA subcarrier frequency.

Accordingly, multiple RxMER captures are typically aggregated in a RxMER file for each cable modem that itself is based upon a large number of data samples received from the cable modem over time, showing specific RxMER values measured over the discrete subcarrier frequencies that may be used to communicate data to and from the cable modem. The RxMER file therefore typically records how the RxMER readings are distributed over frequency, and also allow computation of the percentile distribution of particular MER readings at a specific subcarrier frequency for a particular cable modem over time, i.e., a 90 percentile value at which MER values at a subcarrier frequency for a cable modem were equal to or worse than, a $50^{th}$ percentile such value, a $20^{th}$ percentile such value, etc. An example of such a distribution for a cable modem is shown in FIG. 4.

One potential technique for selecting a representative set of RxMER values for a cable modem as a function of frequency is called "static aggregation" where one particular percentile value, such as 25%, 50%, etc. is used over all subcarriers for that cable modem's aggregated RxMER value. As an example, if an OFDM channel uses 3800 subcarriers and RxMER values were collected once an hour for a week, there would be 168 RxMER captures at each of the 3800 subcarrier frequencies. For a given cable modem and a given subcarrier, the 168 values could be aggregated by computing, say, a $50^{th}$ percentile value from the distribution of the 168 values at that subcarrier. This process is repeated over all the subcarriers for a given cable modem, resulting in a single $50^{th}$ percentile aggregated RxMER data.

As already noted, the selection of the aggregated RxMER value to use at each subcarrier frequency for a cable modem affects both throughput and the amount of time a cable modem is in partial service. If, for example, an RxMER value were selected for a cable modem at a particular subcarrier as one at which 90 percent of the captures were equal to or worse than (a $90^{th}$ percentile value), the relatively high RxMER value would translate to a bitloading profile with a higher QAM value and therefore a higher throughput. However, it would also be expected that the cable modem would often not be able to transmit at that subcarrier and would experience partial service quite frequently. Conversely, if a $5^{th}$ percentile value were selected for that cable modem at that particular frequency, the cable modem would almost always be able to operate at the frequency and therefore avoid partial service, but at the expense of a lower QAM modulation and therefore lower throughput.

Referring to FIG. 5, if the very conservative $5^{th}$ percentile static aggregation value were used, the theoretical throughput is calculated at 1.568 Gbps, but the measured throughput is 1.608 Gbps, which is meaningfully higher (about 40 Mbps). Conversely, if more aggressive percentile static aggregation values are used, the theoretical throughput is very close or slightly below (within 9 Mbps) to the actual throughput measured. Thus, the one-size-fits-all technique of static aggregation just described may not be the most efficient technique of determining aggregate RxMER values, because it can be inferred from FIG. 5 that that additional gains in throughput may be achieved through some other method.

Specifically, the present inventors realized that the static aggregation technique does not account for temporal and frequency variability in the RxMER data. Specifically, transient ingress noise (e.g. mobile interference) can appear at certain points in time and in only a subset of cable modems, depending on their proximity to mobile base stations. Transient ingress noise can also affect only a portion of the spectrum, rather than the entire OFDM/OFDMA spectrum. Thus, in one broad embodiment of the present disclosure, an improved method for assigning bitloading vectors to cable modems will select an aggregated RxMER values to use for the cable modem as a function of subcarrier frequency.

Some such exemplary embodiments may dynamically change the percentile value to use to determine aggregated RxMER values to use for a cable modem based on subcarrier frequency rather than utilizing a fixed value across all subcarrier frequencies. More specifically, for a given cable modem, some embodiments may analyze the distribution of RxMER values at a given subcarrier, or alternately across a range of subcarriers, and use that distribution to dynamically select a percentile value to use to determine the aggregated RxMER value to use at a specific subcarrier frequency. In some preferred embodiments, where the analysis encompasses a range of subcarriers, that range may preferably be less than all of the subcarriers that the cable modem communicates on.

Figures 6, 7:
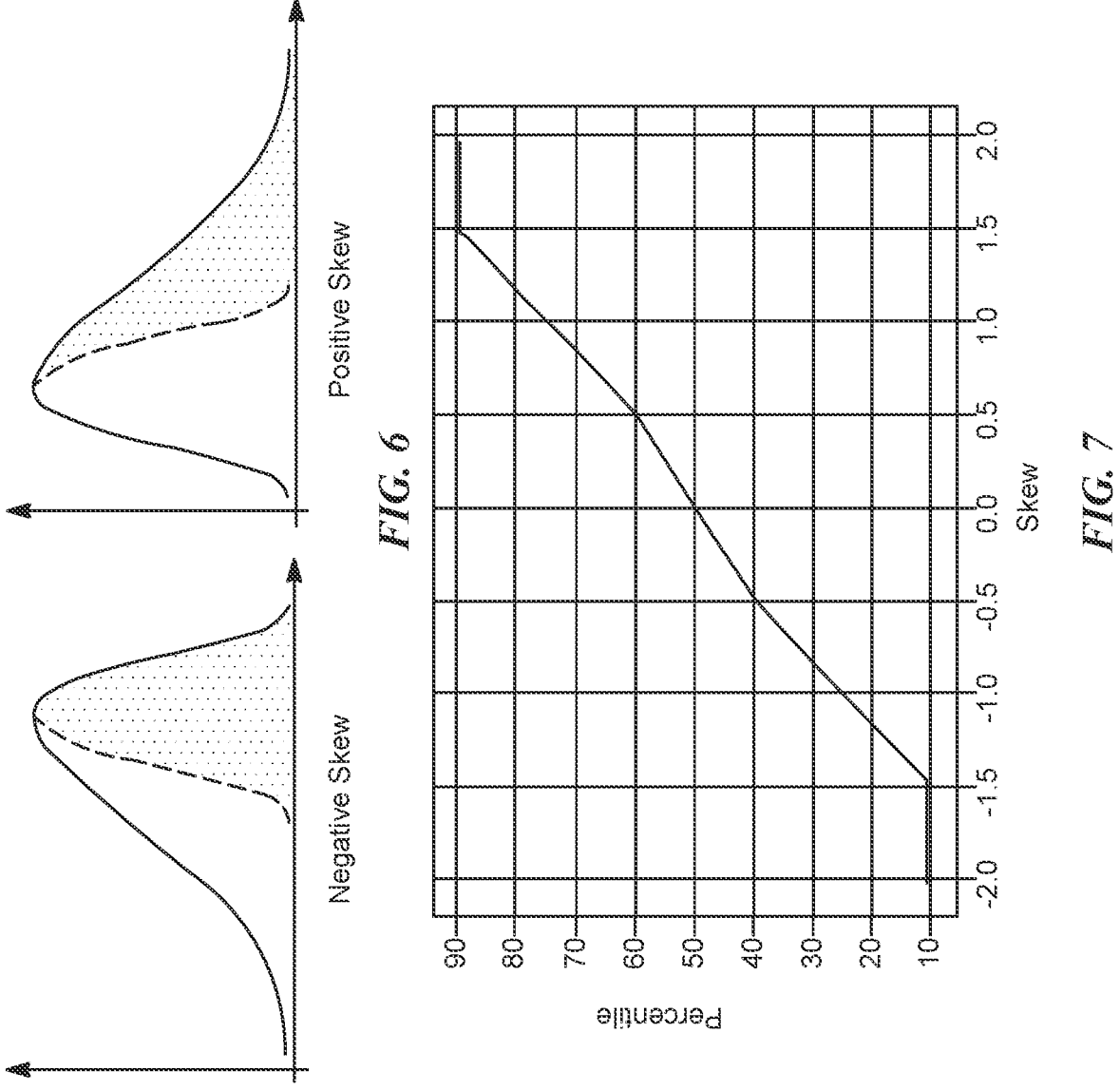
FIG. 6 shows exemplary distributions that exhibit negative and positive skew characteristics.
FIG. 7 shows an exemplary mapping of skew values to selections of percentile error metric values to use in bitloading vector assignments.

Many different analyses of the distribution of RxMER values at a given subcarrier, or range of subcarriers, may be used in conjunction with this disclosed embodiment. For example, the present inventors noticed that subcarrier regions with wireless interference tended to have RxMER distributions with negative skew. Referring to FIG. 6, skewness captures the tail of a distribution such that distributions with a longer tail on the left of the distribution are referred to as having a negative skew while distributions with a longer tail on the right of the distribution are referred to as having a positive skew. Numerically, skew is calculated as $$\text{Skew}=\Sigma Ni(X_i-X_m)^3/(N-1)*\sigma3$$

where "N" is the number of samples in the distribution, "$X_i$" is the value of the $i^{th}$ sample, "$X_m$" is the mean of the distribution, and $\sigma$ is the standard deviation of the distribution.

Figure 8:
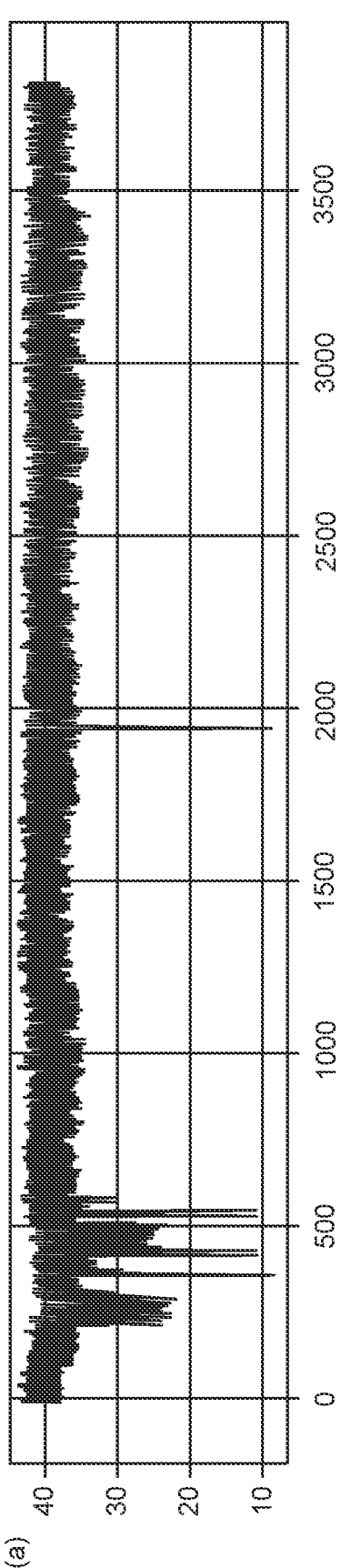
FIGS. 8 and 9 each shows how distributions of error metric values for two exemplary cable modems are converted to percentile value selections using the exemplary mapping of FIG. 7.
Figure 8:
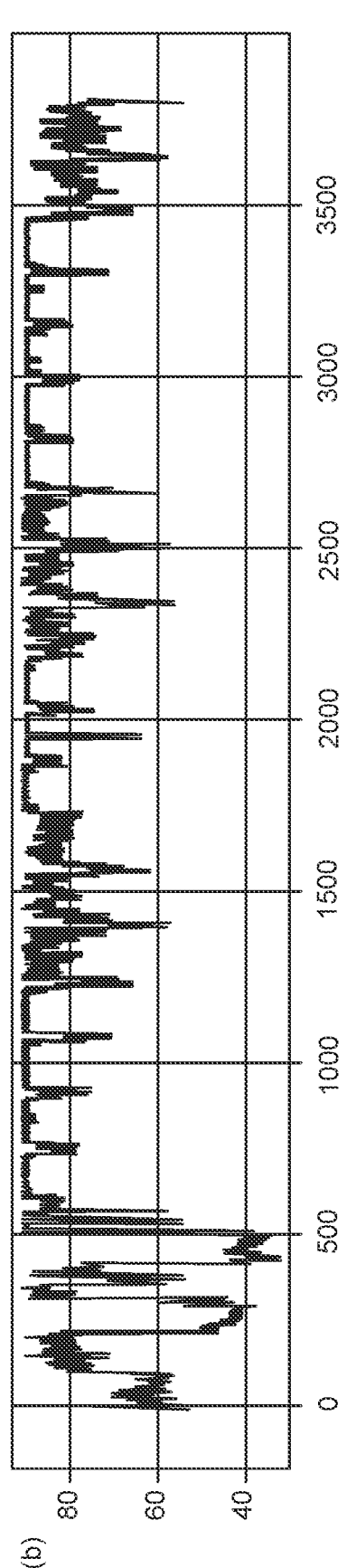
Figure 9:
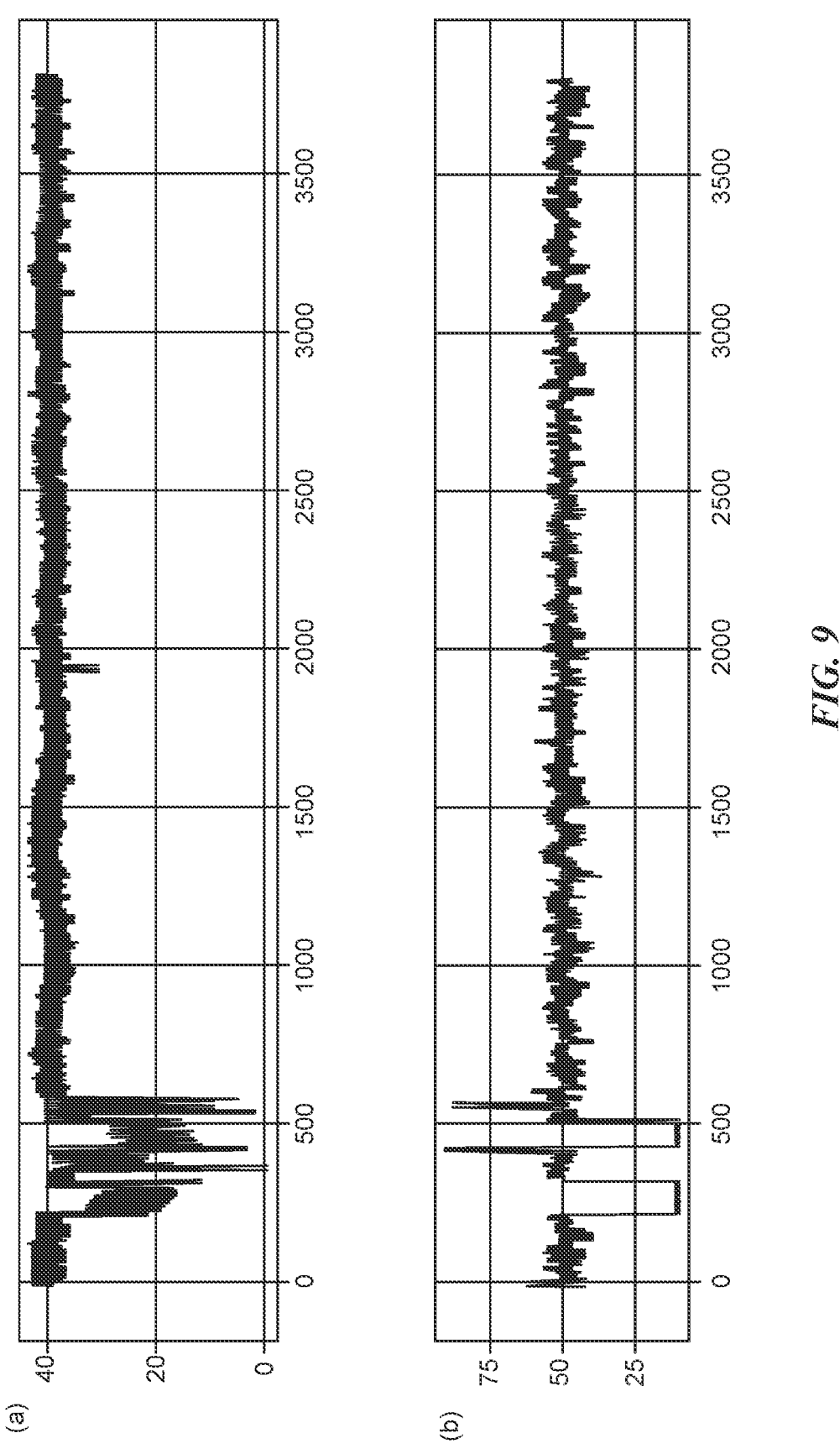

Thus, in one embodiment, to avoid partial service for cable modems while maximizing throughput, relatively lower percentile values are chosen for subcarrier frequencies whose RxMER distributions have negative skews. In further embodiments, relatively higher percentile values are chosen for subcarrier frequencies whose RxMER distributions exhibit positive skew. FIG. 7 shows one exemplary mapping of percentile values used for choosing an aggregated RxMER value for a given subcarrier as a function of the skew of the RxMER distribution at that subcarrier. FIGS. 8 and 9 respectively show both the RxMER distributions and percentile values used to determine aggregated RxMER values selected using the mapping of FIG. 7 for each of two different cable modems.

The mapping of FIG. 7 was heuristically determined, and those of ordinary skill in the art will appreciate that other such mappings may be used. However, preferred mappings may exhibit some common characteristics. For example, preferred mappings will exhibit a range of subcarrier frequencies over which the selected percentile increases as subcarrier frequency increases. Thus, although FIG. 7 shows a preferred embodiment where percentile values increase roughly linearly from −1.5 skew to 1.5 skew, other embodiments may use curves that increase geometrically, while other embodiments may use exponential curves, S-curves, stepwise functions, etc., or any combination of such functions. Those of ordinary skill in the art will appreciate that different mappings may have a different range of skew values over which the percentile values increase as a function of frequency. Similarly, although the preferred embodiment of FIG. 7 is roughly symmetrical around a skew value of approximately zero, other embodiments may use asymmetrical curves. For example, some alternate mappings may have the selected percentile increasing according to some continuous linear or nonlinear function over a range of skew values, but then implement a stepwise, discontinuous jump in percentile value. Similarly, although the preferred mapping of FIG. 7 associates a skew of zero with a percentile value of 50%, or approximately 50%, other embodiments may associate a skew of zero with any other percentile values. For purposes of the specification and claims, the term "approximately" with respect to the disclosed percentile values means plus or minus 10%, i.e., "approximately 50%" would encompass a range of 40% to 60%.

Rather than using skew values, another embodiment of the present disclosure may instead analyze the distribution of RxMER values for a cable modem at a given subcarrier, or range of subcarriers, to mathematically calculate a probability that a cable modem is experiencing mobile interference in a particular subcarrier. As one example of such a mathematical computation, a nominal RxMER value "N" may be calculated that is assumed to represent a relative probability for the distribution at which there is no mobile interference. In a preferred embodiment, the value of "N" may be assumed to be the $80^{th}$ percentile RxMER value from all cable modems over all subcarriers. Then a second value "M" may be calculated that represents a probability, relative to "N" that mobile interference is present at a specific subcarrier for a specific cable modem. In a preferred embodiment, the value "M" may be computed as the $20^{th}$ percentile value or RxMEr values for a given subcarrier of a given cable modem. Thus, the probability that mobile interference is present in a given subcarrier of a given cable modem may be calculated as $$P=[N-M(i,j)]/N, \text{ where } P=0 \text{ if } M(i,j)>N.$$

The foregoing embodiment and formula were determined heuristically, but may be generalized as representing or calculating the probability of mobile interference as a function of the spread or range of RxMER values relative to what would be expected in a "no mobile interference" channel. Referring back to FIG. 4, for example, mobile interference is likely responsible for the chaotic downward spikes in RxMER values between approximately 765-780 MHz, while the tight distribution seen at higher frequencies is relatively free from mobile interference. Such a tight distribution, with no mobile interference may well occur at 40 RxMER, or 30 RxMER etc., but in the foregoing embodiment, the $80^{th}$ percentile value of all cable modems over all frequencies was heuristically determined to represent the typical percentile at which the tight frequency distribution associated with no mobile interference occurred. Similarly, the relative drop of the $20^{th}$ percentile value from the presumed "no interference" percentage (generally capturing the spread of the distribution) was heuristically determined to quantify the likelihood of mobile interference. (Moreover, if the $20^{th}$ percentile value at a given subcarrier was above the $80^{th}$ percentile of all cable modems over all frequencies, it can be assumed that there is no mobile interference).

Those of ordinary skill in the art will appreciate that alternate embodiments may use the same probability equation described above but with different percentile values. Still other embodiments may use other formulas to quantify a range or spread of a RxMER distribution in a subcarrier of a cable modem, downwards from a presumed RxMER value representative of no mobile interference. Still other embodiments may adopt different analyses of RxMER captures to quantify the probability of mobile interference. For example, some embodiments may simply use a standard deviation of RxMER values at a subcarrier frequency as indicative of the presence of mobile interference.

Figure 10:
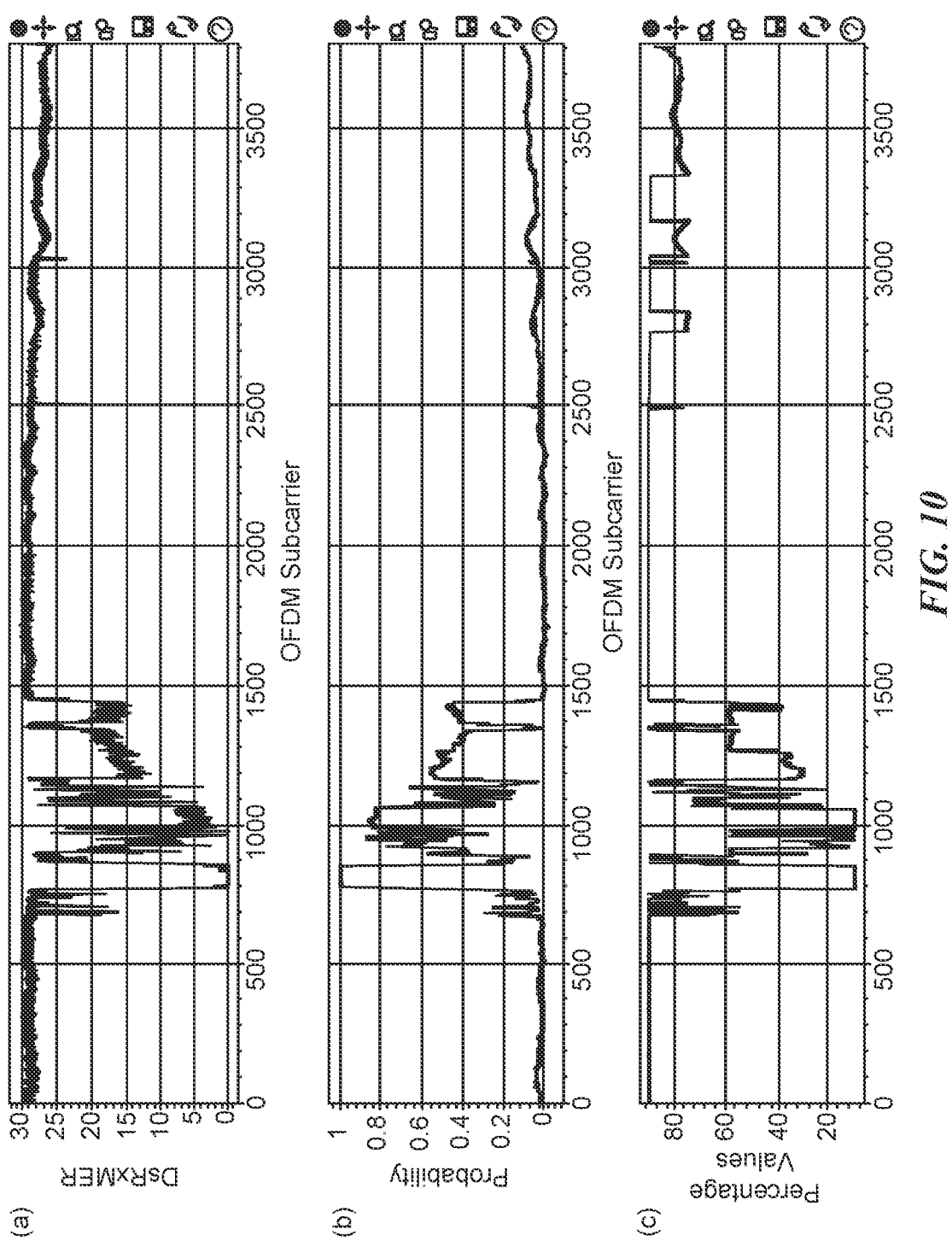
FIG. 10 shows an alternate embodiment that selects an aggregated percentile error metric value for use in bitloading vector assignments by using distribution of error metric values over subcarrier frequencies to estimate a probability of mobile interference at those frequencies.

After a probability of mobile interference for a given subcarrier of a given modem is calculated, an appropriate percentile value may be selected using the same methodology as described above with respect to FIG. 7, i.e., a relationship may be heuristically or otherwise assumed that maps the calculated probabilities to a given percentile value to be used for the subcarrier/cable modem. The general characteristics described with respect to FIG. 7 are also preferably present in such a mapping for embodiments that calculate probabilities of mobile interference as just described. FIG. 10 shows in the top panel a RxMER distribution over OFDM subcarriers measured for a specific cable modem. The middle panel of this figure shows the probabilities calculated at each subcarrier for the cable modem, while the bottom panel shows the percentile values chosen based on a particular heuristic mapping (not shown).

Figure 11A:
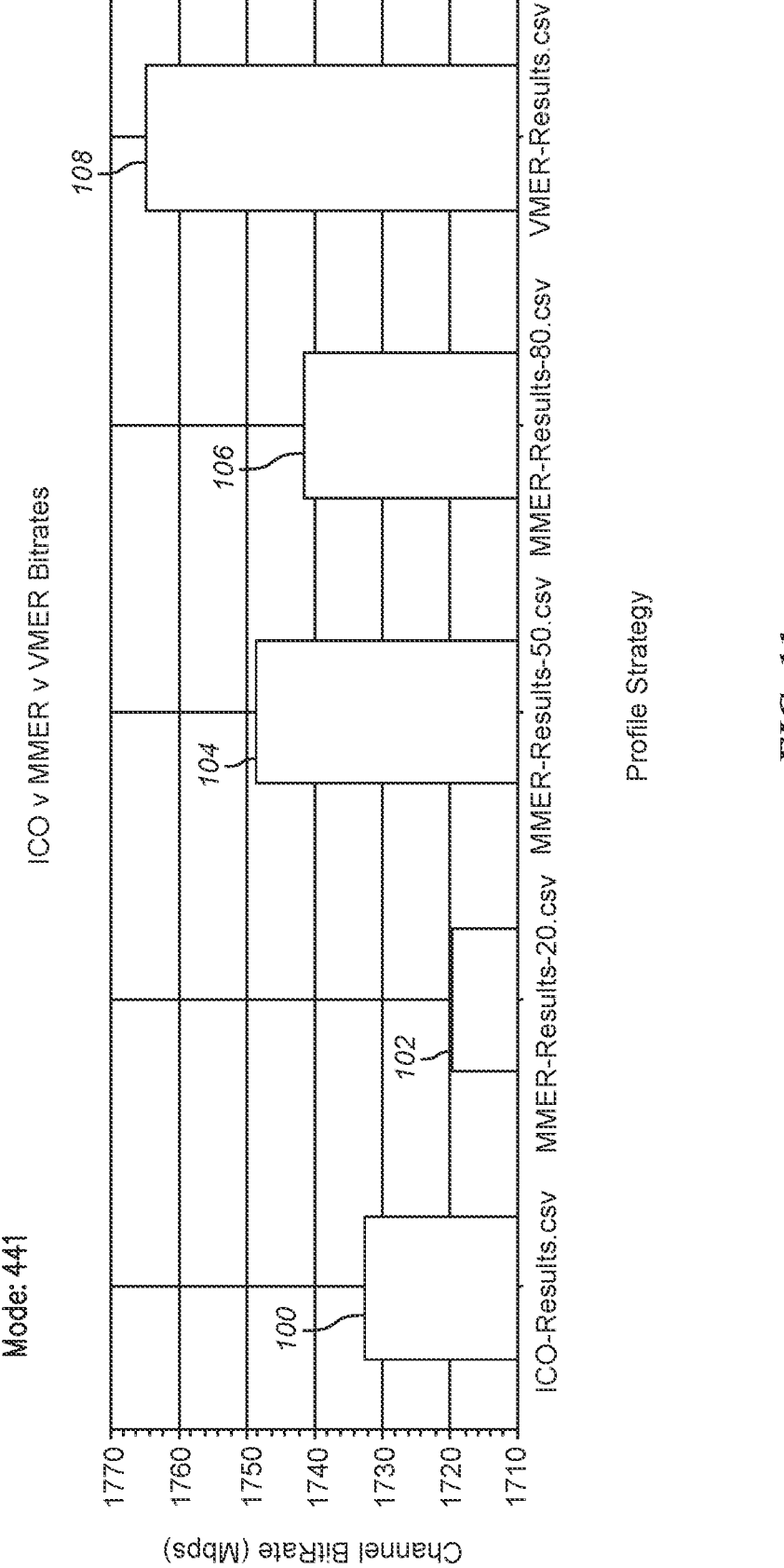
FIGS. 11A and 11B show the benefit of the adaptive aggregation relative to static aggregation.
Figure 11B:
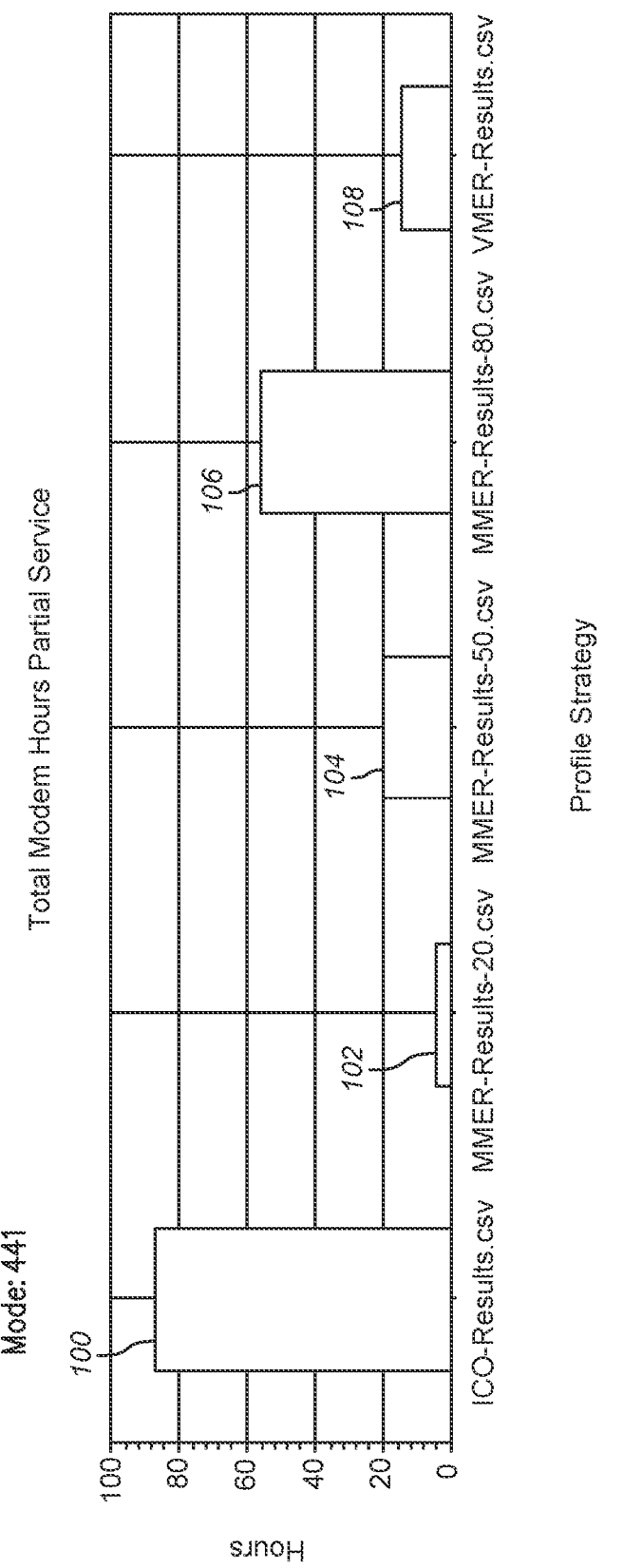

FIGS. 11A and 11B show the benefits of the disclosed adaptive static aggregation techniques. Specifically, FIG. 11A shows the throughput achieved based on data collected over a large number of channels and captured by a large number of cable modems, for each of a number of strategies ranging from strategy 100 in which only one RxMER value is captured for each subcarrier of a cable modem (no aggregation), to strategies selecting respective $20^{th}$, $50^{th}$ and $80^{th}$ static aggregation percentiles (strategies 102, 104, 106), to an adaptive strategy 108 as disclosed in the present disclosure (the mathematical calculation of probabilities using the previously-described formula P=[N−M(i,j)]/N, where P=0 if M(i,j)>N). FIG. 11B shows the total modem hours partial service for each of these strategies. As can bee seen from these figures, the strategy 100 achieves moderately good throughput but has very high hours of partial service. The static aggregation strategy 102 has the lowest hours of partial service, but has extremely low throughput. The adaptive strategy 108, however, has the highest throughput of all the different strategies, while also having a total number of hours in partial service mode almost as low as the static aggregation strategy 102, and lower than either of the other two static aggregation strategies. Thus, as can be seen in these figures, the disclosed adaptive aggregation techniques result significantly improve on static aggregation techniques.

Figure 12:
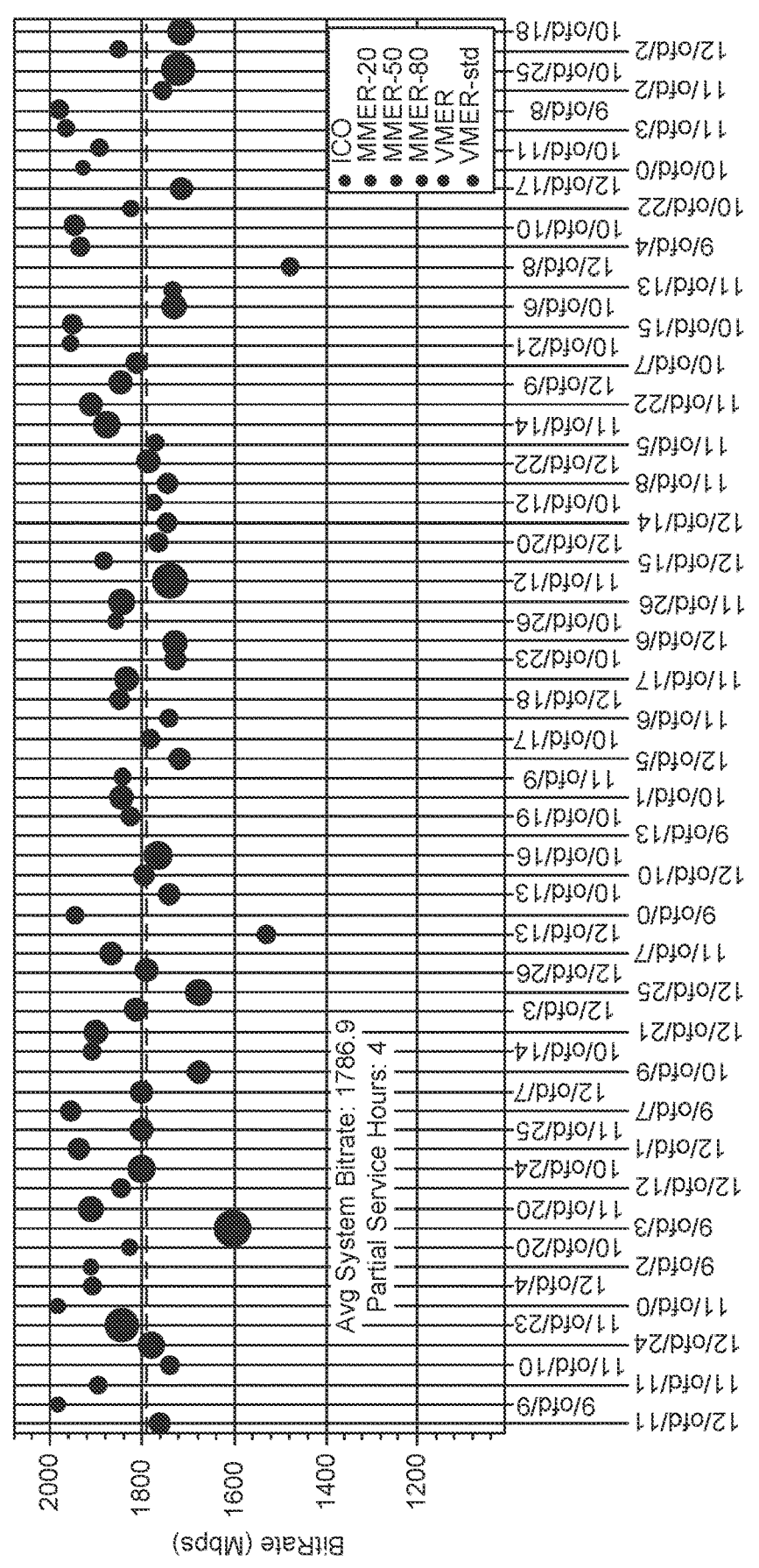
FIG. 12 shows a comparison of the various techniques of selecting an aggregated error metric as a function of OFDM/OFDMA channel.

Referring to FIG. 12, some improvements over the adaptive aggregation techniques may be further achieved by also selecting among aggregation strategies as a function of both cable modem and subcarrier frequency. As seen in this figure, the optimal choice of which strategy to employ may depend on subcarrier frequency as well. Therefore, in some embodiments, the RxMER data for a cable modem across all its subcarriers may be analyzed to determine which strategy to employ, e.g., adaptive based on standard deviation, adaptive based on skew, static 50, static 80, etc. and then that particular strategy employed for that subcarrier of that cable modem.

Also, as indicated earlier, some embodiments of the present invention may use a particular aggregated percentile value statically across all subcarriers of a cable modem, but allow the particular percentile value to vary by cable modem, where that particular percentile value is based upon an analysis of all the RxMER data for the cable modem, across all subcarriers.

Figure 13:
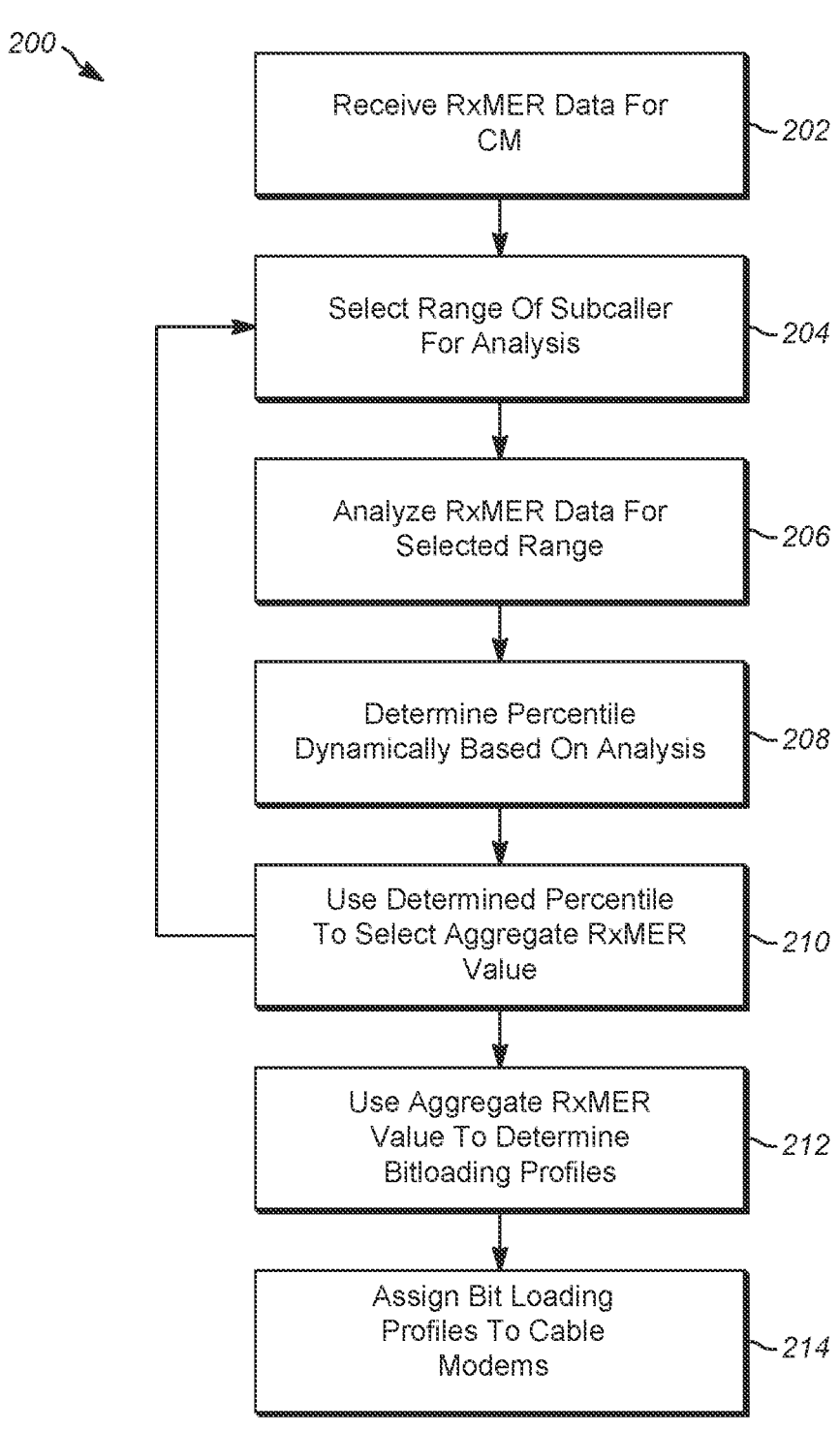
FIG. 13 shows an exemplary method of determining bitloading profiles using an adaptively determined aggregate RxMER value, and assigning the bitloading profiles to cable modems.

FIG. 13 shows an exemplary method 200 of determining bitloading profiles using an adaptively determined aggregate RxMER value, and assigning the bitloading profiles to cable modems. At step 202 RxMER values are received for a given cable modem (CM). At step 204 a range of subcarriers is selected for analysis. As disclosed above, in some embodiments the range of subcarriers may be the full range of subcarriers at which the cable modem is capable of communicating, while in other embodiments the selected range may be less than all of the full range of subcarriers at which the cable modem is capable of communicating. In some preferred embodiments, each subcarrier may be analyzed separately, i.e., the range of subcarriers is one.

At step 206, the RxMER data for the selected range is analyzed and at step 208 a percentile is selected based on the analysis. Any of the techniques described in the foregoing description may be used in this analysis, e.g., the skew of the RxMER data may be used to select a percentile, a probability of mobile interference may be calculated from the RxMER data and the probability used to select a percentile, the standard deviation of the RxMER data may be used to delect a percentile, or any other appropriate analysis may be undertaken.

At step 210, from the determined percentile, an aggregate RxMER value is selected for use over the range of subcarriers in step 204. If there is still RxMER data for the cable modem in subcarriers not yet analyzed, the procedure may revert to step 204 for the selection of a next range of subcarriers not yet analyzed. Once all the subcarriers have been analyzed, and an aggregate RxMER value associated with each subcarrier, at step 212 the aggregate RxMER values may be used to determine a set of bitloading profiles to be allocated among a group of cable modems. At step 214, the bitloading profiles may be distributed among the cable modems.

As noted previously, once aggregate RxMER values are selected each subcarrier of a cable modem, these aggregate RxMER values are used to determine a set of bitloading profiles to assign to cable modems. DOCSIS standards allow the use of multiple profiles in OFDM and OFDMA channels, which allows the use of variable bitloading over multiple subcarriers in the OFDMA channel instead of a "flat" bitloading profile. This use of variable bitloading results in higher channel capacity and improved RF performance, such as noise reduction. The DOCSIS 3,1 standard allows the use of up to 16 profiles in a CMTS and up to four profiles in each cable modem, however a smaller number of profiles may be used in practice due to implementation limitations.

Techniques to create these profiles are vendor specific, but are broadly based on RxMER data collected from cable modems of the CMTS. This data reflects the RF channel characteristic of the OFDM/OFDMA channel between the CMTS and a given cable modem. To create these profiles, which are limited in number, cable modems will typically need to be clustered into a relatively small number of groups to generate a bitloading profile for each group. One current clustering algorithm uses a cluster splitting algorithm, after initially assigning all cable modems to a single cluster, progressively splits large clusters into smaller groups based on an optimization criterion until a desired number is reached. Another existing technique is the K-means clustering technique already discussed in which seed vectors are used to initially populate the desired "n" number of groups or clusters with a cable modem, and then cable modems are successively added to one of the groups based upon Euclidean distance metrics between the error measurements for the cable modem and an error measurement representative of the respective existing clusters.

One problem with all of these approaches is that the optimization criterion (or Euclidean distance metric) used to cluster the cable modems does not directly optimize the bitrate or throughput of the cable modems. Therefore, it is difficult to be assured that an optimal grouping has been achieved.

Disclosed is a novel, improved method of arranging cable modems into a desired number of clusters. The disclosed method may have any one of a number of unique characteristics. First, the disclosed technique begins by assigning each cable modem to its own cluster, i.e., there are originally "N" clusters equal to the number of cable modems to be clustered into "M" groups where "M" is less than "N" (and typically substantially less than "M." Second, the disclosed technique successively conjoins a selected pair of clusters based upon an optimization criteria until the number of cluster is reduced to "M" or below. Third, preferably the optimization criteria directly determines or estimates the throughput of the clusters as "N" is reduced to "M."

Figure 14:
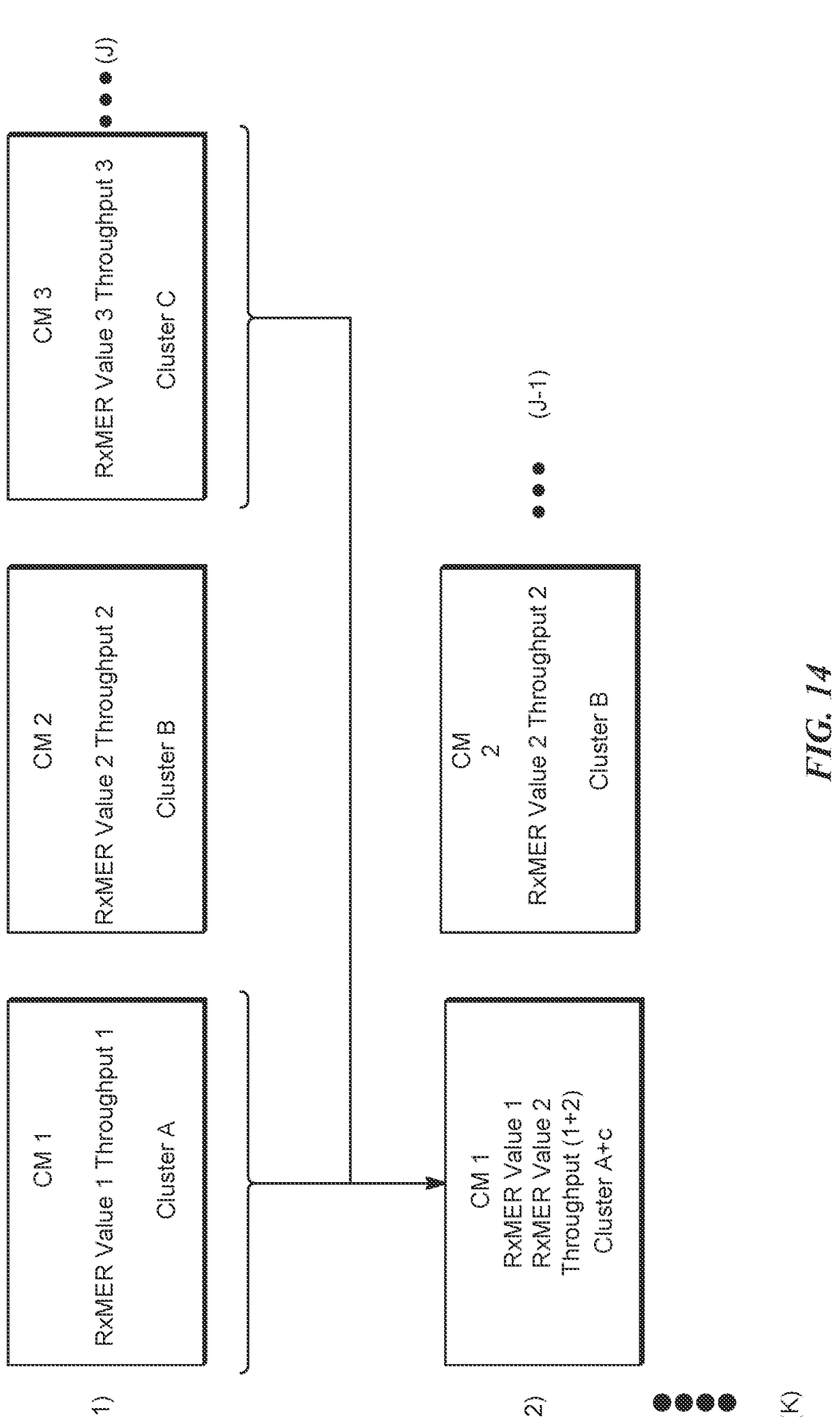
FIG. 14 shows an embodiment of a novel clustering technique disclosed in the present application.

Referring to FIG. 14, for example, at an initial state (1), cable modem CM1, cable modem CM2, cable modem CM3 etc. may each be assigned to its own initial cluster, meaning that there are initially "j" clusters A, B, C, etc. Each cable modem has associated an RxMER value for each subcarrier at which it can communicate, which in some embodiments may be aggregated values, and in some further embodiments may be aggregated values as determined according to the techniques disclosed in the present specification. Each cable modem also has an associated throughput, determined using that cable modem's RxMER value(s). Exemplary embodiments for determining throughput based on RxMER values will be described later in this specification. Thus, the total throughput of the system may be represented as the sum of the throughputs of all the "j" clusters.

To calculate a throughput based on RxMER values, a bit error rate (BER) threshold value may be selected, for example a value of 0.005 may be selected which has been experimentally found to result in zero uncorrectable codewords. With that BER threshold value, each RxMER value for a cable modem (or cluster) can be converted to a bitloading QAM value, and from this QAM value, throughput values may be calculated for each cable modem or cluster of cable modems. FIGS. 15 and 16 show respective tables that associate RxMER values at exemplary BerMax thresholds to QAM values, and associate those QAM values to throughput values.

Referring back to FIG. 14, two clusters in the initial state (1) may be combined into a new cluster, where selection of the two clusters is based upon minimizing the reduction in throughput caused by the combination. Combining two clusters is assumed to reduce the throughput of the cluster to the minimum bitloading of any of the cable modems in the cluster. This minimum bitloading can again be converted to a throughput value for any analyzed combination of two clusters, and the desired pair of clusters for combination thereby selected by simply analyzing all permutations of cluster pairs in the initial state (1).

Assume for example, that after analyzing all permutations of pairs of clusters in state (1), it is determined that the combination of cluster A and Cluster C produces the least reduction in total throughput of the system. Thus, at state (2) there are now (j−1) clusters, where CM 1 and CM 3 occupy a single cluster, and have an associated RxMER value 1 for CM1, an RxMER value 2 for CM 3, and a throughput value that represents the group of cable modems in the cluster A+C. Then the procedure may again analyze all (j−1) clusters to select the optimal combination of two clusters that will minimize the reduction in throughput, and so forth, until the initial j clusters are reduced to the desired number of clusters.

Figure 17:
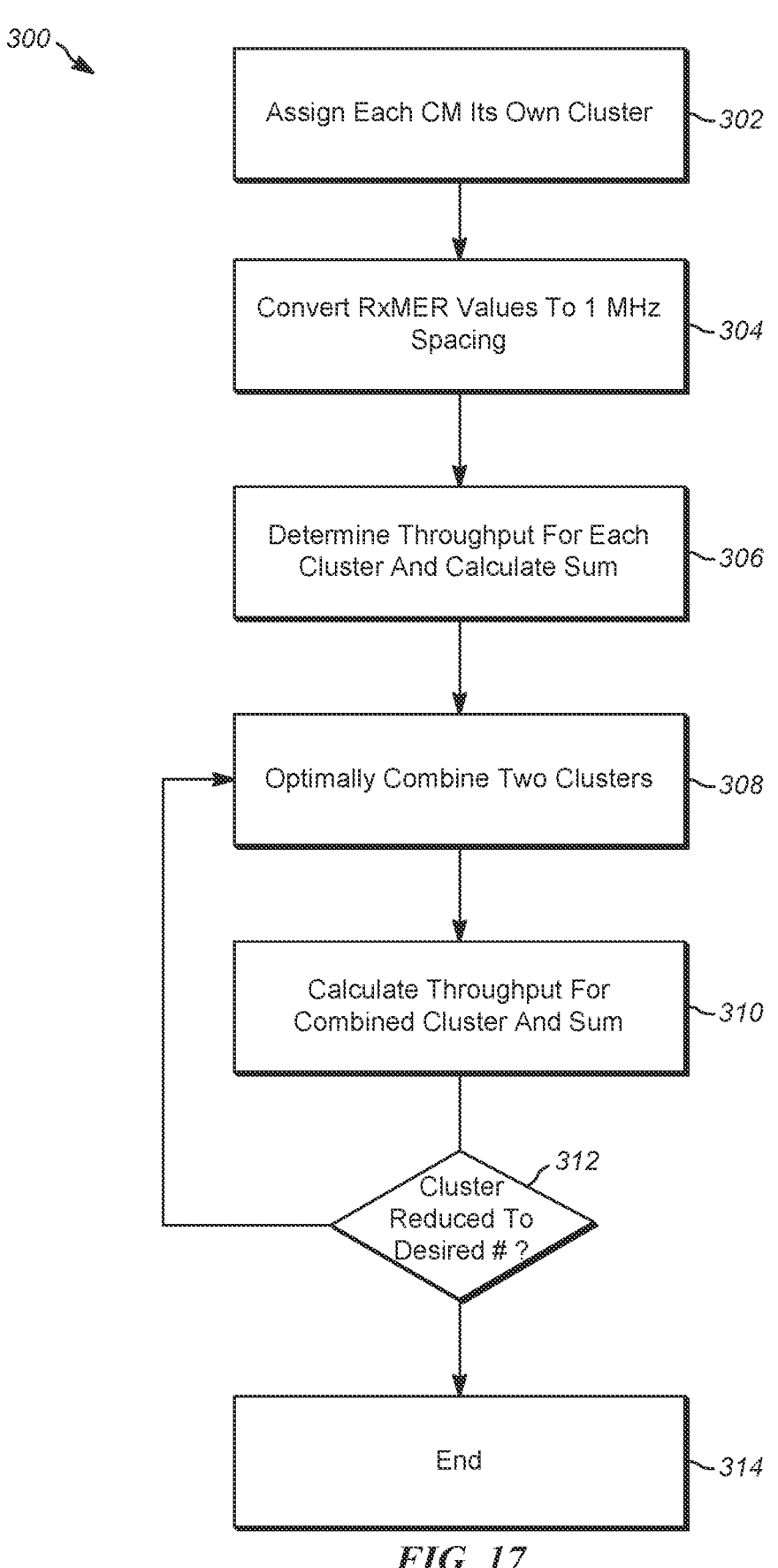
FIG. 17 sows an exemplary method of implementing the clustering technique of FIG. 14.

FIG. 17 summarizes this method 300. AT step 302, assign each cable modem to its own cluster as described above, where each cable modem has an associated RxMER value for each of its subcarriers. Optionally, at step 302, the granularity of these RxMER values may be converted to a wider 1 MHz spacing to simplify processing. At step 306, a throughput for each cluster may be calculated based on the RxMER values. For example, as described above, in some embodiments throughput may be calculated by determining a QAM level associated with an RxMER value, assuming a desired BerMAx threshold value. At step 306, once these individual throughputs are calculated, a sum of all the individual throughputs may be calculated.

At step 308, permutations of pairs of clusters are analyzed to determine an optimal combination of two clusters, where the optimal combination is one that minimizes a reduction in the total throughput of all clusters after the combination. At step 310 the throughput is calculated for the combined cluster. At step 310 it is determined whether the number of clusters has been reduced to the desired number. If so, the procedure stops at step 314, otherwise the procedure reverts to step 308.

The computationally expensive part of method 300 is step 310. If there were millions of cable modems to cluster, this approach would be difficult to implement but in practice the number of cable modems in a service group is on the order of hundreds, and with the pre-computations shown in FIGS. 15 and 16, the complexity may be further reduced. Moreover, because throughput is proportional to the bits per symbol of the QAM rate, the sum of QAM values over all the subcarriers of a cable modem or cluster can be used as an approximate metric in step 306, providing further reductions in computational complexity.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein. In the event of inconsistent usages between this document and those documents so incorporated by reference, the usage in the incorporated reference(s) should be considered supplementary to that of this document; for irreconcilable inconsistencies, the usage in this document controls. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method for allocating bitloading profiles to a cable modem, the method comprising:
   receiving error data for the cable modem spanning a plurality of subcarriers;
   selecting a range of subcarriers;
   determining a percentile value based on an analysis of the error data in the selected range;
   using the percentile value to determine an aggregated error metric;
   associating the aggregated error metric with each subcarrier in the selected range;
   determining a plurality of bitloading profiles based on the association of the aggregated error metric with each subcarrier in the selected range; and
   allocating at least one of the plurality of bitloading profiles to the cable modems in a manner that affects the throughput of at least one of an OFDM transmission to the cable modem and OFDMA transmission from the cable modem.

2. The method of claim 1 where the selected range of subcarriers includes less than the number of subcarriers in the plurality of subcarriers.

3. The method of claim 1 where the selected range of subcarriers is a single subcarrier.

4. A method for allocating bitloading profiles to a cable modem, the method comprising:
   receiving error data for the cable modem spanning a plurality of subcarriers, each subcarrier having a plurality of error datum associated with it;
   incrementally selecting each subcarrier in the plurality of subcarriers and, for each incrementally selected subcarrier:
      determining a percentile value based upon an analysis of the respectively associated plurality of error datum; and
      using the determined percentile value to associate an aggregated error metric for the selected subcarrier;
   determining a plurality of bitloading profiles based on the association of the aggregated error metric for each subcarrier in the plurality of subcarriers; and
   allocating at least one of the plurality of bitloading profiles to the cable modems in a manner that affects the throughput of at least one of an OFDM transmission to the cable modem and OFDMA transmission from the cable modem.

5. The method of claim 4 where the percentile value varies over the plurality of subcarriers.

6. The method of claim 4 where lower percentile values are associated with subcarrier frequencies whose error value distributions have negative skews.

7. The method of claim 6 including using a measurement of skew to determine the percentile value.

8. The method of claim 4 where lower percentile values are associated with subcarriers having a higher probability of mobile interference in a subcarrier.

9. The method of claim 8 including estimating a probability of mobile interference in a subcarrier from the error data.

10. A CMTS having a processor configured to:

receive error data for a cable modem spanning a plurality of subcarriers, each subcarrier having a plurality of error datum associated with it;

incrementally select each subcarrier in the plurality of subcarriers and, for each incrementally selected subcarrier:

determine a percentile value based upon an analysis of the respectively associated plurality of error datum; and use the determined percentile value to associate an aggregated error metric for the selected subcarrier;

determine a plurality of bitloading profiles based on the association of the aggregated error metric for each subcarrier in the plurality of subcarriers; and allocate at least one of the plurality of bitloading profiles to the cable modems in a manner that affects the throughput of at least one of an OFDM transmission to the cable modem and OFDMA transmission from the cable modem.

11. The CMTS of claim 10 where the percentile value varies over the plurality of subcarriers.

12. The CMTS of claim 10 where lower percentile values are associated with subcarrier frequencies whose error value distributions have negative skews.

13. The CMTS of claim 12 including using a measurement of skew to determine the percentile value.

14. The CMTS of claim 10 where lower percentile values are associated with subcarriers having a higher probability of mobile interference in a subcarrier.

15. The CMTS of claim 14 including estimating a probability of mobile interference in a subcarrier from the error data.

* * * * *